United States Patent [19]

Blaszynski et al.

[11] Patent Number: 5,279,173
[45] Date of Patent: Jan. 18, 1994

[54] APPARATUS AND METHOD FOR REPAIRING A GEAR

[75] Inventors: Robert H. Blaszynski, Waukesha; Jerry C. Sem, Pewaukee, both of Wis.

[73] Assignee: Hartnischfeger Corporation, Milwaukee, Wis.

[21] Appl. No.: 972,851

[22] Filed: Nov. 6, 1992

[51] Int. Cl.$^5$ .................................................. B21D 53/28
[52] U.S. Cl. ................................................ 74/448; 74/439
[58] Field of Search ................ 74/439, 448; 212/175; 29/402.8; 414/694

[56] References Cited

U.S. PATENT DOCUMENTS

| | | | |
|---|---|---|---|
| 1,384,623 | 7/1921 | Meredith, Jr. | 74/448 |
| 3,742,779 | 7/1973 | Shaver | 74/448 |
| 3,888,357 | 6/1975 | Bauer et al. | 74/448 X |
| 4,622,860 | 11/1986 | Cametti et al. | 74/448 |

FOREIGN PATENT DOCUMENTS

| | | | |
|---|---|---|---|
| 954339 | 9/1974 | Canada | 74/448 |
| 9531 | 9/1900 | Norway | 74/448 |
| 1346890 | 10/1987 | U.S.S.R. | 74/448 |
| 127769 | 6/1919 | United Kingdom | 74/448 |

Primary Examiner—Rodney H. Bonck
Assistant Examiner—William O. Trousdell
Attorney, Agent, or Firm—Jansson & Shupe, Ltd.

[57] ABSTRACT

The invention relates to a machine having a driven gear, service access to which is partially obstructed. An aspect of the invention involves an aperture permitting access to the driven gear through a spatial area away from the obstructed region. The driven gear includes a plurality of arc-like segments mounted on a spider for removal individually and the dimensions of at least one segment and the aperture are cooperatively selected to permit a segment to be removed through the aperture to the spatial area. Segments of the driven gear may thereby be removed for service while yet avoiding removal of the driving gear or other substantial disassembly. A method for replacing the driven gear includes forming the aperture, detaching a segment and removing the segment through the aperture to the spatial area.

8 Claims, 6 Drawing Sheets

APPARATUS AND METHOD FOR REPAIRING A GEAR

FIELD OF THE INVENTION

This invention is related generally to machinery and, more particularly, to machinery in which access to wearing parts is partially obstructed.

BACKGROUND OF THE INVENTION

Machinery powered by electric motors or internal combustion engines (typically referred to as "prime movers") often use gears, shafts and the like to form what is referred to a drive train providing power to perform an end-use function. Automobiles, metal cutting and shaping machines, toggle-type presses and construction and earth-moving machines are but a few examples of such machinery.

As more specific examples, such machinery drive trains uses gears and shafts in speed reducers to reduce speed (from that of the motor or engine output shaft) and increase torque and/or to change the direction of power flow. Shafts interconnect "stages" of gearing or connect a final gearing stage to an output device such as automobile wheels, press head or, in the case of an earth-moving machine known as a walking dragline, to a "walk leg" drive.

In such machines, the drive train components (gears, shafts and the like) range in size from a few pounds to several thousand pounds. Another characteristic of certain types of machines, e.g., toggle presses and walking draglines, is that certain machine functions tend to load (and wear) drive train components unevenly. For example, the drive train of a toggle press (especially that portion driving the toggle press head mechanism) is most heavily loaded over only that fraction of a revolution relating to the final, piece-forming part of the press stroke. In a walking dragline, the walk leg drive is most heavily loaded only during that part of a revolution, nominally about 120° or less, during which the dragline is being lifted to take a "step."

To keep the machine functioning efficiently and in condition to satisfactory perform its task, worn parts need to be replaced or repaired. However, with larger machines, maintenance and parts replacement can be an imposing challenge, especially if the parts are large and unwieldly. And the problem of repair and replacement is often aggravated in that access to gear train parts is obstructed. There may be other machine components which, unless major parts of the machine are dismantled, prevent access to such parts along any direction except through a relatively small open spatial area. Nowhere is this more true than in large mobile machines such as earth-moving and earth-excavating machinery.

Such machinery is available in a wide variety of types ranging from the familiar rubber-tire mounted and crawler-mounted to the less-common dragline and the invention is described in connection with an exemplary dragline.

A dragline is often used for removing top soil and "overburden" to expose a valuable mineral, e.g., coal, beneath but near the earth's surface. Draglines are equipped with an angularly-extending boom from which is suspended a "bucket" having an open mouth and digging teeth, both pointing toward the main portion of the machine.

Overburden is removed by placing the bucket on the ground at a point distant from the machine and pulling it toward the machine, filling the bucket in the process. Once filled, the machine pivots about a central axis and the bucket emptied at a spoil pile somewhat away from the area being excavated.

Smaller draglines are crawler mounted (much like a military tank) and capable of movement in the same way albeit at much slower speeds. However, as draglines (and their digging buckets) increased in size, crawler mounting was found to be impractical and in the early 1900's, the "walking" dragline was developed. The walking dragline is so named because it takes short "steps" and uses a "walk leg" mechanism (which resembles a human leg) to do so. A difference is that in a walking dragline, both legs step simultaneously.

To give some perspective to the following discussion, an exemplary large walking dragline——made by Harnischfeger Industries of Milwaukee, Wis.——has a main housing portion (including the machinery deck, operator's cab and the like) which is about 105 feet long, about 80 feet wide, about 40 feet high and weighs about nine million pounds. The boom extends about 300 feet and the capacity of the digging bucket is about 80 cubic yards. The walk legs of such dragline take steps about seven feet in length. For reasons that will become apparent, the arrangement of such exemplary dragline prohibits access, except by major disassembly, to certain components of the walkleg mechanism.

An invention facilitating expedited, relatively easy repair of a drive train component having a region through which access to the component is obstructed would be an important advance in the art.

OBJECTS OF THE INVENTION

It is an object of this invention to provide an improved apparatus and method for repairing a gear which overcomes some of the problems and shortcomings of the prior art.

Another object of this invention is to provide an improved apparatus and method for repairing a gear adjacent to a region through which access to the gear is obstructed.

Yet another object of this invention is to provide an improved apparatus and method for repairing a gear while yet avoiding major disassembly of the machine on which the gear is mounted.

How these and other important objects are accomplished will be apparent from the following descriptions and from the drawing.

SUMMARY OF THE INVENTION

The invention is an improvement in a mobile machine of the type having a driving gear engaging a driven gear. The gears power a mechanism propelling the machine. In such machine, the driving gear and other machine components are unavoidably positioned in a way that there is a region through which access to the driven gear is obstructed. However, there is a relatively open spatial area away from the region of gear engagement.

In the improvement, the machine includes an aperture permitting access to the driven gear through the spatial area away from the obstructed region. The driven gear includes a plurality of arc-like segments mounted for removal individually. The dimensions of each segment are selected to permit a segment to be removed through the aperture to the spatial area so that the driven gear may be conveniently removed and replaced, segment by segment, while yet avoiding removal of the driving gear or otherwise gaining access to the driven gear through the obstructed region.

In a highly preferred embodiment, the driven gear is constituted as an assembly and includes a web-like spider. Each curved segment is mounted on the spider for individual removal therefrom. Especially in larger machines having gears and gear segments which are very heavy and difficult to handle, it is preferred that each segment be redundantly attached to the spider by first and second attachment mechanisms attaching the segment and the spider to one another. While each attachment mechanism is generally capable of securing the segment and the spider to one another, redundant attachment mechanisms helps prevent machine down time (and the consequent need to replace a segment) in the event of failure of a single attachment mechanism.

In one highly preferred embodiment, the driven gear has an axis of rotation and a first mechanism joins a segment and the spider along a radius generally normal to such axis. Further, a second mechanism joins a segment and the spider along an attachment axis generally parallel to the axis of rotation.

The improved method for replacing the driven gear includes the steps of forming an aperture permitting access to the driven gear through a spatial area away from the region of gear engagement. A driven gear is provided and includes a spider and a plurality of arc-like gear segments removably attached to the spider. Such method includes the further steps of detaching a segment from the spider and removing the segment through the aperture to the open spatial area. In that way, each segment may be individually removed and replaced while yet avoiding removing the driving gear or otherwise attempting access to the driven gear through the obstructed region. In a highly preferred method, the providing step includes providing a driving gear having at least three gear segments, each of which spans an arc of about 120°. As a more specific aspect, the detaching step includes manipulating the first and second attachment mechanisms to detach each gear segment.

The inventive apparatus and method are described below in connection with a type of above-ground mining machinery called a walking drag line. However, one of ordinary skill in the art will, after appreciating the details of the invention, readily understand how such apparatus and method may be used in connection with mobile machines of other types.

DETAILED DESCRIPTION OF THE PREFERRED EMBODIMENTS

Before describing the preferred embodiments and the new method, it should be appreciated (and persons of ordinary skill will appreciate) that the improved apparatus 10 and method are applicable for servicing stationary mounted "in-factory" machines and mobile machinery. This specification describes aspects of a segmented gear. While segmented gears per se are known, use of such a gear in the manner claimed is, insofar as is known, new. The invention clearly offers convenience in machines of moderate size and becomes more compelling as the size of the machine increases. To help "dramatize" and emphasize this fact, the invention is disclosed in connection with one of the largest types of machines in the world, a walking dragline 11.

Figure 1:
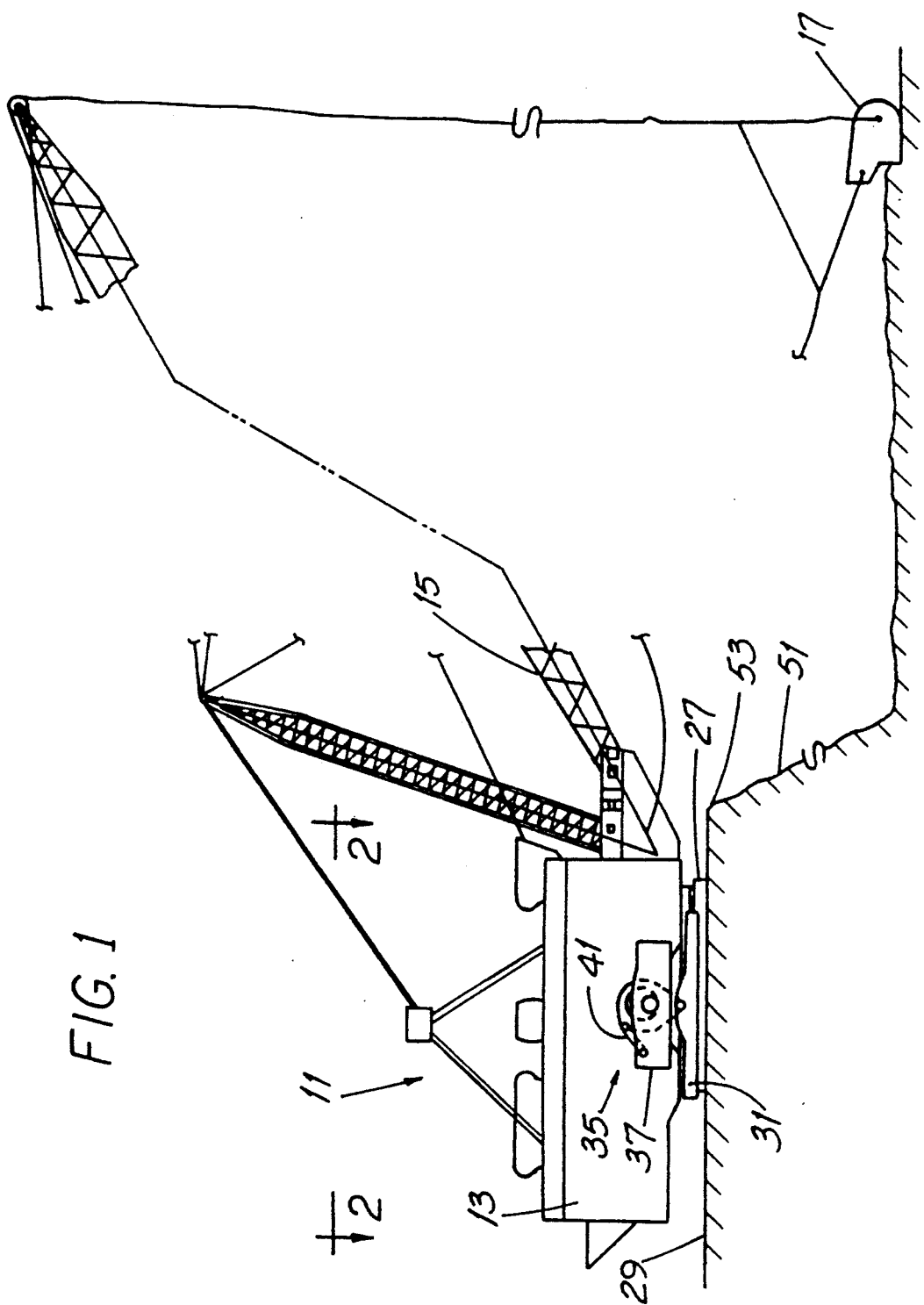
FIG. 1 is a representative side elevation view of a walking dragline.
Figure 2:
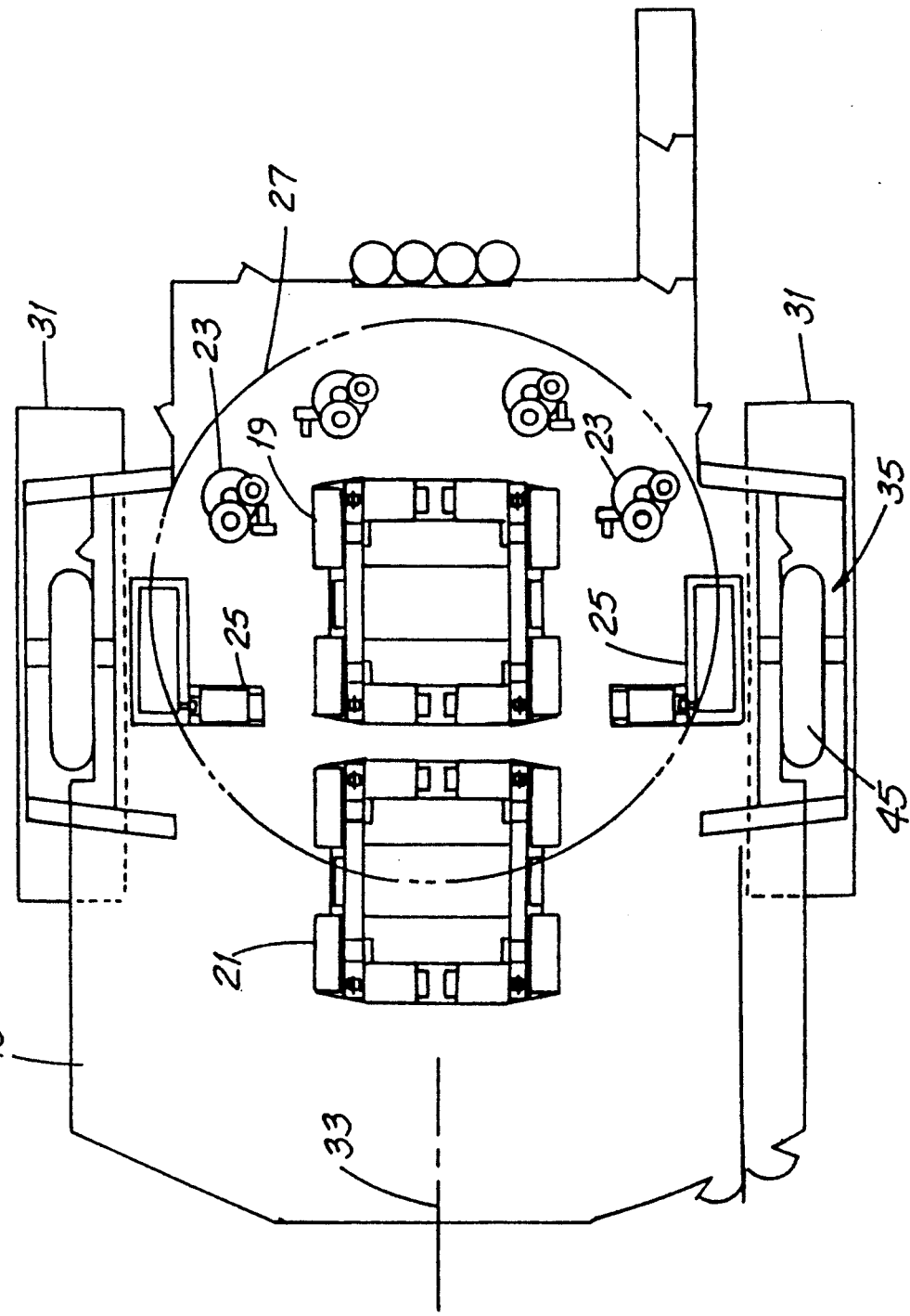
FIG. 2 is a top plan view, in phantom, of the main housing portion of the dragline of FIG. 1, taken along the viewing plane 2—2 thereof and with parts broken away.
Figure 3A:
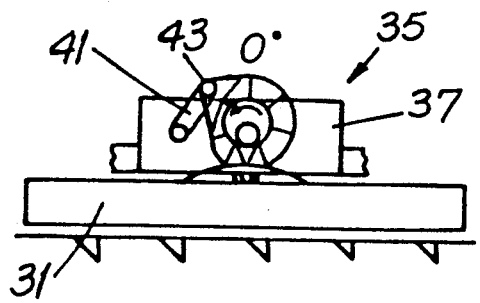
FIGS. 3A-3G show a sequence of operation of the walk leg at the right side of the dragline of FIG. 1. Such right-side walk leg is that shown in FIG. 1.
Figure 3B:
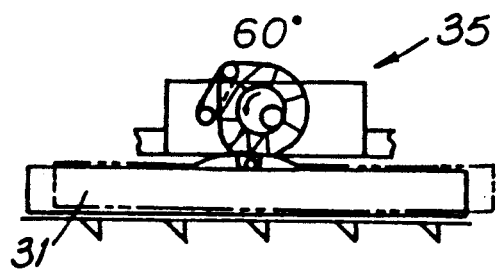
Figure 3C:
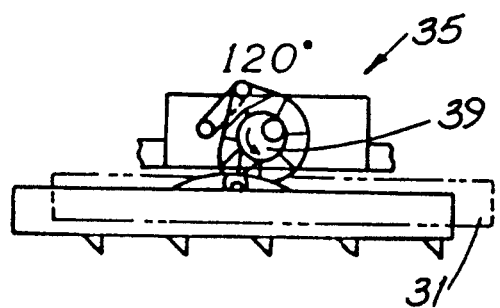
Figure 3D:
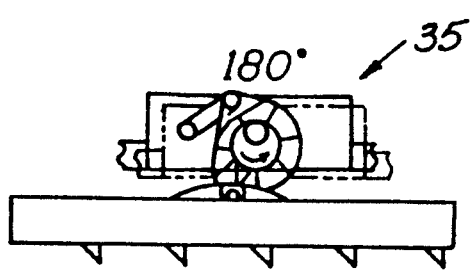
Figure 3E:
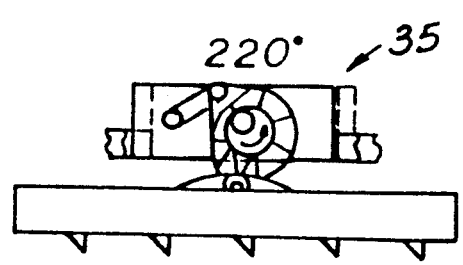
Figure 3F:
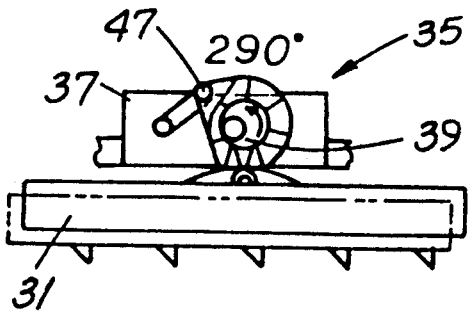
Figure 3G:
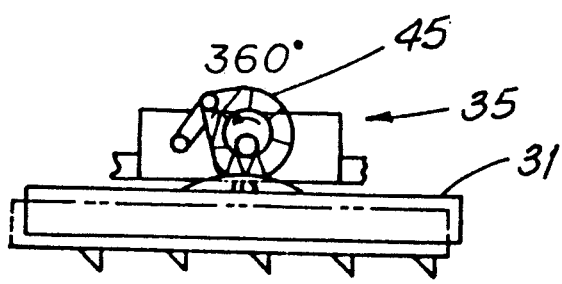

Referring first to FIGS. 1 and 2, an exemplary walking dragline 11 includes a main housing portion 13 having a boom 15 extending therefrom to support and manipulate a digging bucket 17. Within the housing portion 13 are mounted the bucket hoist, bucket drag and swing systems 19, 21 and 23, respectively. The drive 25 for the "walking" system is also mounted therein. When digging, the dragline 11 sits on and pivots about a generally circular "tub" or platform 27 which rests on the earth's surface 29.

The dragline 11 also includes a pair of pads or "shoes" 3 which, when moved in unison as described below, lift the platform 27 and move the dragline 11 rearward away from the bucket 17. Movement in the exemplary dragline 11 is in "steps" of about seven feet in length and along the long axis 33 of the main housing portion 13.

Referring additionally to FIGS. 3A-3G and FIG. 4, a walk-like mechanism 35 typically includes a walk leg housing 37, a driven eccentric 39 and a knee link 41. The knee link 41 has its upper end 43 coupled to the walk leg housing 45 by a pin 47 to permit relative rotation of a few degrees between the link 41 and the housing 45. The lower end of the knee link 41 is similarly coupled to the nearby main housing structure 37. As a rough analogy, the coupling at the upper end 43 of the link 41 is analogous to the human knee and the eccentric 39 is analogous to the human hip joint.

As the eccentric 39 is driven counterclockwise (in the right-side sequence of FIGS. 3A-3G) through one revolution, the shoe 31 is lowered to ground contact and the dragline 11 lifted and moved rearward. The shoe 31 is then raised until the platform 27 again rests on the surface 29. Since the bucket 17 is drawn toward the dragline 11, removal of overburden 51 progresses toward the dragline 11 until the edge 53 of the pit becomes relatively near to the dragline 11. Therefore, the dragline 11 must occasionally be moved rearward a few feet to expose additional overburden 51 for digging.

Figure 4:
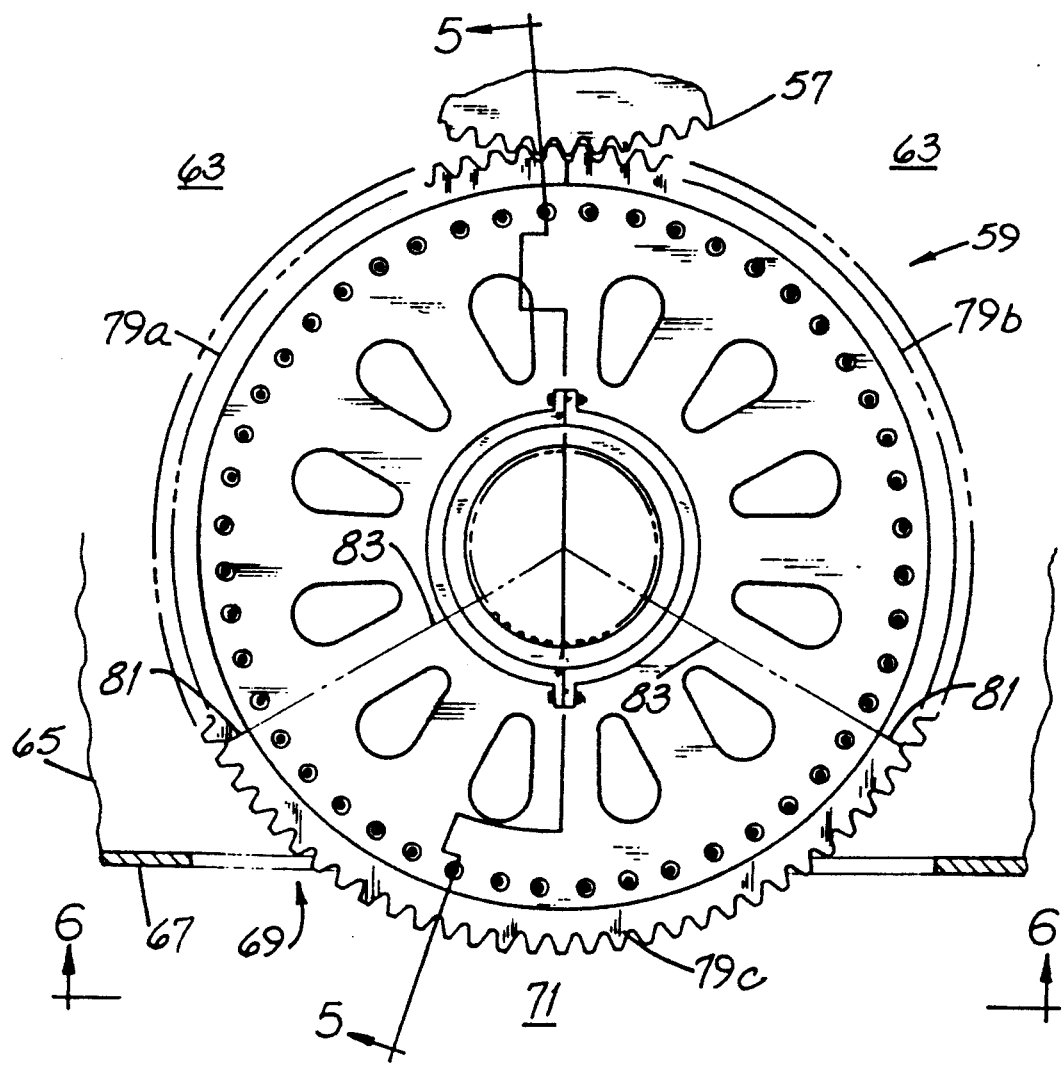
FIG. 4 is an elevation view of a gear assembly shown in conjunction with a driving pinion gear and a deck outrigger and its bottom plate. Parts are broken away and other parts are shown in phantom outline. The view of FIG. 4 is taken generally along the viewing plane 4—4 of F 5.
Figure 5:
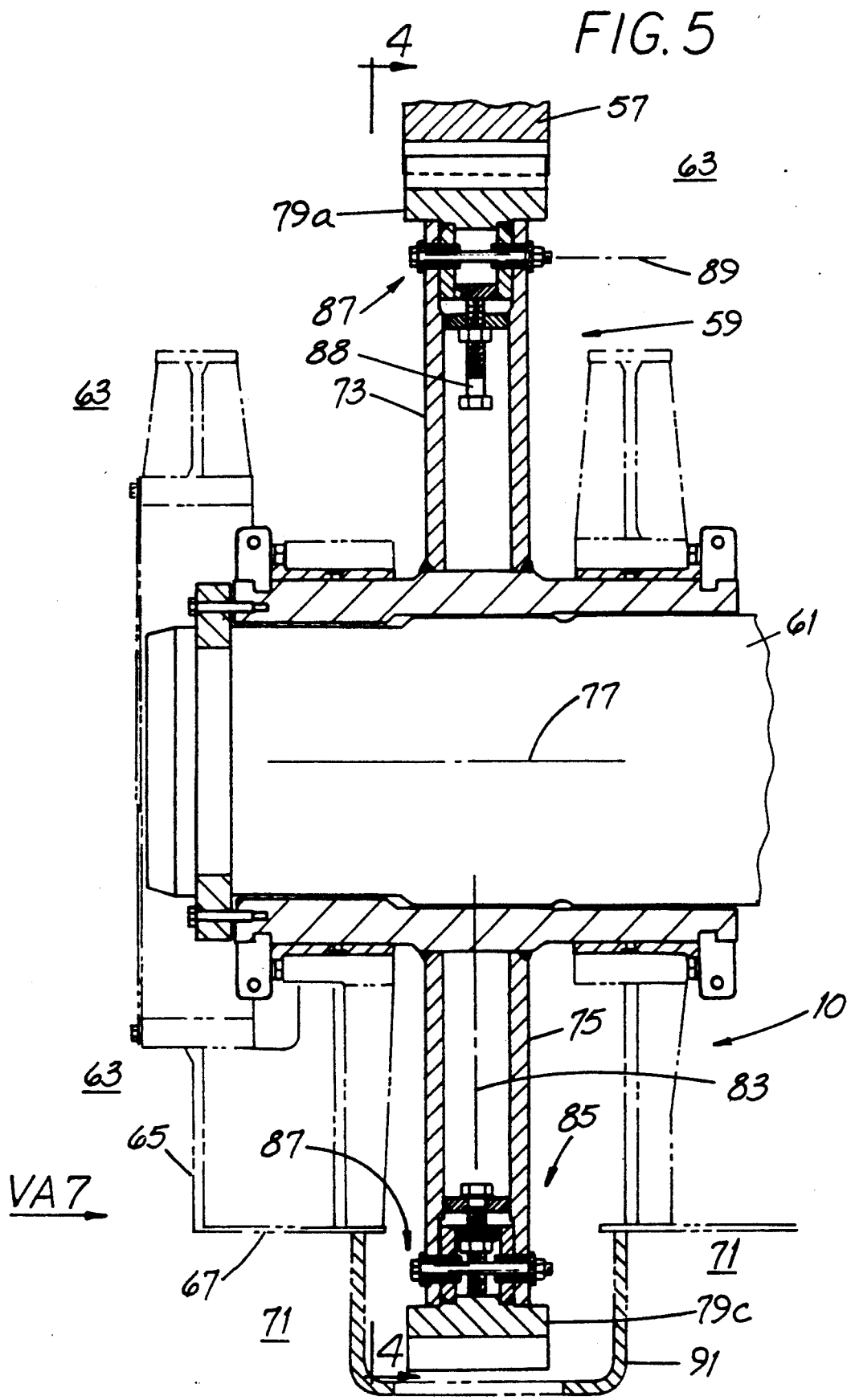
FIG. 5 is an elevation view taken along the section line 5—5 of FIG. 4 and showing the gear assembly of FIG. 4 in conjunction with a shaft driven by the assembly, with the deck outrigger and with a grease drip pan attached to the outrigger. Parts are broken away, other parts are in cross-section and yet other parts are in phantom outline.

Referring to FIGS. 4 and 5, the invention relates to a pinion-type driving gear 57 and, more particularly, to the gear assembly 59 driven by such pinion gear 57. The driven gear 59 is concentric with and rotatably powers the walk leg shaft 61 which, in turn, drives the eccentric 39.

From time to time, components of the dragline 11 need to be serviced, i.e., repaired or replaced and, of course, this is true with respect to the driven gear 59. For example, such gear 59 may need to be removed from the dragline 11 to, e.g., repair a broken tooth or replace the gear. Particularly in the exemplary dragline 11 (and in other complex gear-driven machines) there is a region 63 through which access to the driven gear 59 is obstructed.

As is apparent from FIGS. 4 and 5, the driving gear 57 impedes access to the driven gear 59 in the region of gear engagement. And the driving gear 57 is not the only impediment to access; the main housing portion 13 is nearby and likewise impedes access. Further, the deck outrigger 65 including its lower plate 67 are very near the driven gear 59 and severely limit access.

If the driven gear 59 is required to be repaired or worse, removed, that fact presents a major task since substantially the entire walk-like assembly 35 must be dismantled. For larger machines, these parts are very heavy and large. For example, in one exemplary walking dragline 11, the driven gear 59 is over fourteen feet in diameter and weighs in excess of seventy thousand pounds. The walk shaft (which connects the driven gear to the eccentric) is over fifteen feet long and weighs several thousand pounds.

Figure 6:
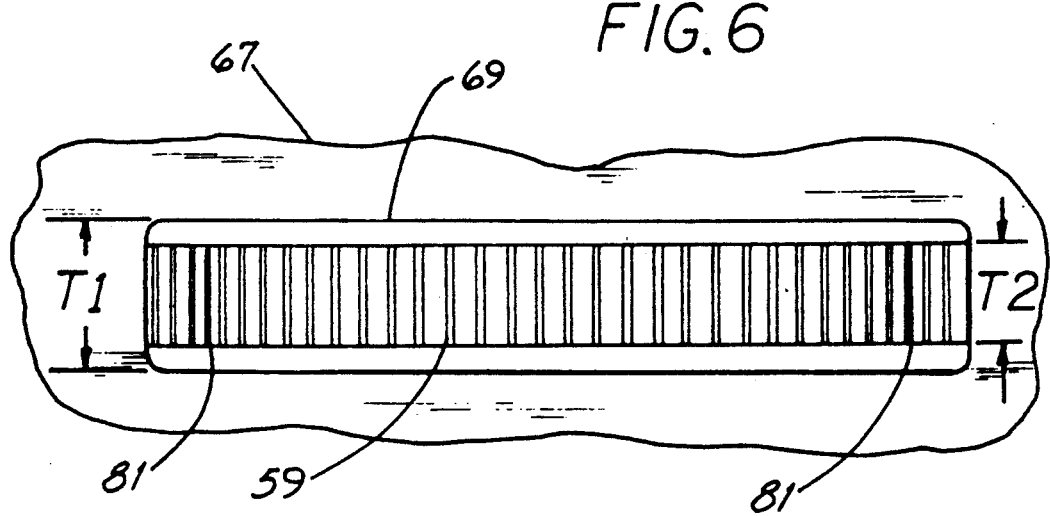
FIG. 6 is an upward-looking view taken along the viewing plane 6—6 of FIG. 4 and showing an aperture in the deck outrigger. Parts are broken away.

In the invention, an aperture 69 (shown in FIG. 6) is formed in the lower plate 67 of the deck outrigger 65 and such aperture 69 permits access to the driven gear 59 through a spatial area 71 away from the region 63 through which access is obstructed. The driven gear 59 is constituted as an assembly and includes a spider 73 made of two disc-shaped plates 75 spaced from one another and mounted generally normal to the axis of rotation 77. The gear 59 has a plurality of arc-like gear segments 79a, 79b, 79c mounted on the spider 73 for individual removal. In a highly preferred arrangement, each segment 79 has an arc length of about 120° although, clearly, such arc length can vary widely without departing from the invention. Each segment 79 has a pair of end faces 81, each of which is coincident with a radius 83 of the gear 59. When so formed, the segments 79 fit onto the spider 73 wedge-like to one another.

Figure 7:
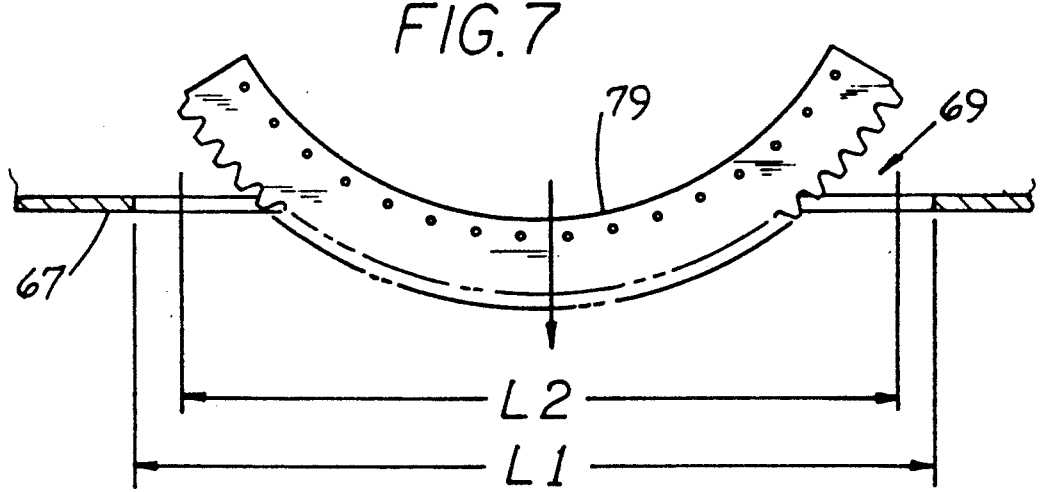
FIG. 7 is an elevation view taken along the viewing axis VA7 of FIG. 5 and showing a segment of the gear assembly, a portion of the deck outrigger bottom plate and the aperture in the bottom plate.

The dimensions of each segment 79 and those of the aperture 69 are cooperatively selected to permit a segment 79 to be removed through the aperture 69 to the spatial area 71. More specifically (and referring also to FIG. 7), the length L1 of the aperture 69 is preferably slightly greater than the projected length L2 (as opposed to the length measured along the arc) of the segment 79. Further, the width Ti of the aperture 69 is preferably slightly greater than the width T2 of the segment 79. When so arranged and when the attachment mechanisms 85, 87 (discussed below) are removed, the segment 79 can be lowered downward using a fork lift truck (not shown) or the like.

The gear assembly 59 includes first and second attachment mechanisms 85 and 87, respectively, and these are redundant to the extent that they both attach a segment 79 and the spider 73 to one another. The first attachment mechanism 85 joins a segment 79 and the spider 73 along a radius 83 generally normal to the axis of rotation 77 of the gear 59. Such mechanism 85 has a primary purpose (not relevant here) which is only casually related to ongoing spider-segment attachment during machine operation. However, the fact remains that such mechanism 85 must be manipulated in order to detach the gear segment 79.

The second attachment mechanism 87, in the nature of a through-bolt arrangement, joins a segment 79 and the spider 73 along an attachment axis 89 generally parallel to the axis of rotation 77. Such mechanism 87 must also be manipulated to detach a gear segment 79.

One reason (although certainly not the only reason) why one may wish to repair or replace only a segment 79 is that as mentioned above, only a portion of the circumference of the gear 59 is loaded in the dragline 11. Such loading is only while the dragline 11 is "walking" and occurs over 120° or less of the gear perimeter.

To effect repair of a gear such as the driven gear 59 (on any type of machine where access to such a gear is severely limited), the following procedure may be used. The shroud-like lubricant drip pan 91 (if there is one) is first removed to expose a gear segment 79, e.g., segment 79c. While intermittently rotating the gear 59 under power over small increments of rotation, the mechanisms 85, 87 are detached.

Before detaching all of the second attachment mechanisms 87 (and assuming the exemplary gear 59 is being accessed from the bottom as shown so that gravity aids removal), a segment 79 is supported by a fork lift truck or other support device appropriate in the circumstance. After being fully supported, any remaining attachment mechanisms 85 are removed and, perhaps with some urging by jackscrews 88, the segment 79 is allowed to drop and is removed through the aperture 69 to the open spatial area 71.

Of course, the principles described here are applicable for any gear like the gear 59 which is adjacent to a region 63 through which access to the driven gear is obstructed. This is so as long as there is at least some open spatial area 71 through which access can be gained. It is also true irrespective of whether access is gained at the top, bottom or anywhere around the perimeter of the gear 59. In other words, the relative locations of the obstructed region 63 and the open spatial area 71 are unrelated to the efficacy of the invention. And, of course, for access at or near the top of the gear 59, segment-lifting rather than segment-supporting equipment would be used to remove a segment 79.

From the foregoing, it is apparent that the new method and apparatus 10 dramatically reduces machine downtime (which is very costly) and helps make such machine more productive.

While the principles of this invention have been described in connection with specific embodiments, it should be understood clearly that these descriptions are made only by way of example and are not intended to limit the scope of the invention.

We claim:

1. In a mobile machine having a driving gear engaging a rotatable driven gear for powering a mechanism propelling the machine from one location to another, the improvement comprising:

an aperture below the driven gear permitting access to the driven gear through a space below the aperture;

and wherein:
the driven gear includes a plurality of arc-like segments mounted for removal individually;
at least one segment has a projected length and the aperture has a length not less than the segment projected length,
whereby a segment of the driven gear may be lowered through the aperture.

2. The machine of claim 1 wherein each segment includes first and second attachment mechanisms redundantly attaching the segment and the spider to one another.

3. The machine of claim 2 wherein the driven gear has an axis of rotation and the first mechanism joins a segment and the spider along a radius generally normal to the axis.

4. The machine of claim 2 wherein the driven gear has an axis of rotation and the second mechanism joins a segment and the spider along an attachment axis generally parallel to the axis of rotation.

5. In a mobile machine having a driving gear engaging a rotating driven gear for powering a mechanism propelling the machine and wherein there is a region through which access to the driven gear is obstructed, an improved method for repairing the driven gear including, in either order, the steps of:
forming an aperture below the driven gear for permitting access to the driven gear through a space below the aperture;
providing a driven gear which includes a spider and a plurality of arc-like gear segments removably attached thereto and wherein one of the segments has become damaged;
and further includes the steps of:
rotating the driven gear until the damaged segment is positioned substantially vertically above the aperture;
detaching the damaged segment from the spider; and,
lowering the damaged segment through the aperture to the space.

6. The method of claim 5 wherein the providing step includes providing a driven gear having at least three segments.

7. The method of claim 5 wherein the detaching step includes manipulating first and second attachment mechanisms.

8. The method of claim 6 wherein the detaching step includes manipulating first and second attachment mechanisms to detach a gear segment.

* * * * *

UNITED STATES PATENT AND TRADEMARK OFFICE
CERTIFICATE OF CORRECTION

PATENT NO. : 5,279,173
DATED : January 18, 1994
INVENTOR(S) : Robert H. Blaszynski and Jerry C. Sem It is certified that error appears in the above-indentified patent and that said Letters Patent is hereby corrected as shown below:

On the title page under "Assignee" please delete "Hartnischfeger" and insert "Harnischfeger".

In column 3, line 68, delete "F" and insert --FIGURE--.

In column 4, line 43, delete "3" and insert --31--.

In column 5, line 60, delete "Ti" and insert --T1--.

Signed and Sealed this

Twelfth Day of July, 1994

Attest:

BRUCE LEHMAN

Attesting Officer    Commissioner of Patents and Trademarks